United States Patent [19]
Song et al.

[11] Patent Number: 5,976,581
[45] Date of Patent: *Nov. 2, 1999

[54] CONTINUOUS CHEWING GUM MANUFACTURING PROCESS USING REWORK GUM

[75] Inventors: Joo H. Song, Northbrook; Christafor E. Sundstrom, Glen Ellyn; David W. Record, River Forest; Donald J. Townsend, Chicago; Kevin B. Broderick, Berwyn; Philip G. Schnell, Downers Grove, all of Ill.

[73] Assignee: Wm. Wrigley Jr. Company, Chicago, Ill.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/528,517

[22] Filed: Sep. 12, 1995

[51] Int. Cl.⁶ .................................................. A23G 3/30
[52] U.S. Cl. ........................................................ 426/3
[58] Field of Search ............................................ 426/3–6

[56] References Cited

U.S. PATENT DOCUMENTS

| | | | |
|---|---|---|---|
| H1241 | 10/1993 | Synosky et al. | 426/3 |
| 1,852,005 | 4/1932 | Garbutt | 426/5 |
| 1,855,017 | 4/1932 | Geller | 426/3 |
| 1,887,930 | 11/1932 | Hatherell | 426/3 |
| 1,953,295 | 4/1934 | Garbutt | 426/5 |
| 2,123,531 | 7/1938 | Hatherell | 426/6 |
| 2,125,562 | 8/1938 | Hatherell | 426/6 |
| 2,197,240 | 4/1940 | Hatherell | 426/6 |
| 2,256,190 | 9/1941 | Bowman | 426/5 |
| 2,284,804 | 6/1942 | De Angelis | 426/3 |
| 2,288,100 | 6/1942 | Mason | 426/3 |
| 2,383,145 | 8/1945 | Moose | 426/6 |
| 2,468,393 | 4/1949 | Corkery et al. | 426/6 |
| 3,618,902 | 11/1971 | Brennen, Jr. | 259/6 |
| 3,795,744 | 3/1974 | Ogawa et al. | 426/3 |
| 3,826,847 | 7/1974 | Ogawa et al. | 426/3 |
| 3,984,574 | 10/1976 | Comollo | 426/4 |
| 3,995,064 | 11/1976 | Ehrgott et al. | 426/3 |
| 4,064,274 | 12/1977 | Mackay et al. | 426/3 |
| 4,068,004 | 1/1978 | Carlin et al. | 426/3 |
| 4,187,320 | 2/1980 | Koch et al. | 426/3 |
| 4,202,906 | 5/1980 | Ogawa et al. | 426/3 |
| 4,208,431 | 6/1980 | Friello et al. | 426/3 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,352,822 | 10/1982 | Cherukuri et al. | 426/4 |
| 4,357,354 | 11/1982 | Kehoe et al. | 426/3 |
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | DeTora et al. | 426/3 |
| 4,490,395 | 12/1984 | Cherukuri et al. | 426/3 |

(List continued on next page.)

FOREIGN PATENT DOCUMENTS

| | | |
|---|---|---|
| 0 273 809 A2 | 7/1988 | European Pat. Off. . |
| 0 524 902 A1 | 1/1993 | European Pat. Off. . |
| 2 635 441 | 2/1990 | France . |
| 1 538 785 | 1/1979 | United Kingdom . |
| 2 049 705 | 12/1980 | United Kingdom . |
| WO 95/08272 | 3/1995 | WIPO . |
| WO 95/10194 | 4/1995 | WIPO . |
| WO 95/10947 | 4/1995 | WIPO . |
| WO 95/10948 | 4/1995 | WIPO . |

OTHER PUBLICATIONS

*Food Manufacturing*, "Extrusion: does chewing gum pass the taste test?" pp. 48–50, Sep. 1987.
*Ingredients Extra*, "Extrusion technology for chewing gum production" pp. 4 and 12, Jun. 1994.
*J. Agric. Food Chem.*, "Thermal Decomposition of Some Phenolic Antioxidants" pp. 1063–69, vol. 39, 1991.
Two page document entitled "Mixing Processes used in the Manufacture of Chewing Gum," by R. Schilling, undated.
Three page letter from Buss America dated Aug. 22, 1989 describing Buss kneading extruder and its uses.
Brochure entitled "D–Tex Continuous Compounding Twin Screw Extruders," 4 pages, published by Davis–Standard (undated).
Brochure entitled "Continuous Mixers For The Polymer Industry," Bulletin No. 234–B, publised by Farrel Corporation, 1991.
Brochure entitled "Farrel–Rockstedt Twin–Screw Extruders," 6 pages, published by Farrel Corporation (undated).
Brochure entitled, "Leistritz Extrusionstechnik, The Universal Laboratory Extruder System," 24 pages, published by American Leistritz Extruder Corporation (undated).
Brochure entitled, "Leistritz Extrusionstechnik, The Multi–Extrusion–System for Mixing–, Kneading– and Strandextrusion ZSE GG+GL," 20 pages, published by American Leistritz Extruder Corporation (undated).

(List continued on next page.)

*Primary Examiner*—Arthur L. Corbin
*Attorney, Agent, or Firm*—Steven P. Shurtz; Brinks Hofer Gilson & Lione

[57] ABSTRACT

A method of continuously producing a chewing gum composition comprises the steps of continuously adding fresh chewing gum ingredients into a continuous mixer; subjecting the fresh chewing gum ingredients to a continuous mixing operating within the mixer, thereby forming a chewing gum composition; continuously discharging the chewing gum composition from the continuous mixer while fresh chewing gum ingredients continue to be introduced and mixed within the mixer; and adding a portion of a previously produced chewing gum composition to the mixer and mixing the portion of previously produced chewing gum with the fresh chewing gum ingredients being continuously added to the mixer and mixed to form the chewing gum composition.

31 Claims, 6 Drawing Sheets

OTHER PUBLICATIONS

Two page document from Rubber Extrusion Technology program, dated Feb. 8–10, 1993.

Brochure entitled "Buss Kneading Extruder Technology for the Food Industry," 18 pages, (undated).

Brochure entitled "Extrusion Processing of Shear–Sensitive Food Products," 23 pages, Nov. 1987.

Advertisement entitled "Duss Extrusion Technology (40 years of experience included),"1 page, undated.

Brochure entitled "The Teledyne Readco Continuous Processor," 2 pages, published by Teledyne Readco, York, PA (undated).

Brochure entitled "Mitsubishi PTE Twin–Screw Extruder," 6 pages, Mitsubishi Heavy Industries, Ltd. (date unknown).

Brochure entitled "Mitsubishi Thermoplastic Extruders," 10 pages, Mitsubishi Heavy Industries, Ltd. (date unknown).

Brochure entitled "Buss Technology For The Continuous Compound of Gum Base," by George Fischer of Buss Gruppe, Apr. 22, 1995, 9 pages.

Brochure entitled "Buss Technology For The Continuous Compounding of Chewing Gum and Bubble Gum," by Bernd Rose of Buss Gruppe, Apr. 24, 1995, 8 pages.

Brochure entitled "Production of Chewing Gum and Bubble Gum Mases on the Buss Kneading–Extruder," Mar. 1985, 8 pages.

Brochure entitled, "Verfahrenstechnieche orientierung NR. 42" (Process Technology Guide No. 42), 25 pages (and an English translation thereof, 15 pages)., Aug. 22, 1983.

Article entitled, "Herstellung und Aromatisierung von Kaugummi auf Basis von Saccharose und Zuckeraustrausch–stoffen," Jan. 1981, 21 pages.

Article entitled, "Chewing Gum Formulation," from *The Manufacturing Confectioner*, Sep. 1988, 8 pages.

Brochure entitled, "Chewing Gum,"by Axel H. Suck, 59 pages, undated.

U.S. PATENT DOCUMENTS

| Patent No. | Date | Inventor | Class |
|---|---|---|---|
| 4,514,423 | 4/1985 | Tezuka et al. | 426/3 |
| 4,515,769 | 5/1985 | Merritt et al. | 424/49 |
| 4,555,407 | 11/1985 | Kramer et al. | 426/5 |
| 4,590,075 | 5/1986 | Wei et al. | 426/5 |
| 4,711,784 | 12/1987 | Yang | 426/5 |
| 4,721,620 | 1/1988 | Cherukuri et al. | 426/6 |
| 4,738,854 | 4/1988 | Friello et al. | 426/3 |
| 4,740,376 | 4/1988 | Yang | 426/5 |
| 4,794,003 | 12/1988 | Cherukuri et al. | 426/6 |
| 4,816,265 | 3/1989 | Cherukuri et al. | 426/5 |
| 4,824,680 | 4/1989 | Bernatz et al. | 426/3 |
| 4,850,842 | 7/1989 | Van Alstine | 425/205 |
| 4,861,600 | 8/1989 | Chisari et al. | 426/3 |
| 4,872,884 | 10/1989 | Cherukuri et al. | 426/3 |
| 4,876,095 | 10/1989 | Yang | 426/3 |
| 4,882,172 | 11/1989 | Van Astine | 425/113 |
| 4,933,189 | 6/1990 | Cherukuri et al. | 426/3 |
| 4,940,594 | 7/1990 | Van Alstine | 426/231 |
| 4,968,511 | 11/1990 | D'Amelia et al. | 426/6 |
| 4,992,280 | 2/1991 | Yun Chu et al. | 426/5 |
| 5,023,093 | 6/1991 | Cherukuri et al. | 426/3 |
| 5,045,325 | 9/1991 | Lesko et al. | 426/5 |
| 5,059,103 | 10/1991 | Bruckmann et al. | 425/67 |
| 5,075,291 | 12/1991 | DuRoss | 514/60 |
| 5,110,607 | 5/1992 | Yang | 426/3 |
| 5,135,760 | 8/1992 | Degady et al. | 426/5 |
| 5,158,725 | 10/1992 | Handa eta l. | 264/40.7 |
| 5,158,789 | 10/1992 | DuRoss | 426/3 |
| 5,229,148 | 7/1993 | Copper | 426/3 |
| 5,324,530 | 6/1994 | Kehoe et al. | 426/516 |
| 5,397,580 | 3/1995 | Song et al. | 426/5 |
| 5,413,799 | 5/1995 | Song et al. | 426/3 |
| 5,415,880 | 5/1995 | Song et al. | 426/3 |
| 5,419,919 | 5/1995 | Song et al. | 426/5 |
| 5,486,366 | 1/1996 | Song et al. | 426/5 |
| 5,538,741 | 7/1996 | Richey et al. | 426/4 |
| 5,543,160 | 8/1996 | Song et al. | 426/3 |
| 5,545,416 | 8/1996 | Broberick et al. | 426/3 |

FIG. 10 the continuous manufacture of chewing gum bases and products. U.S. Pat. No. 3,995,064, issued to Ehrgott et al., discloses the continuous manufacture of gum base using a sequence of mixers or a single variable mixer. U.S. Pat. No. 4,459,311, issued to DeTora et al., also discloses the continuous manufacture of gum base using a sequence of mixers. Other continuous gum base manufacturing processes are disclosed in European Patent Publication No. 0,273,809 (General Foods France) and in French Patent Publication No. 2,635,441 (General Foods France).

U.S. Pat. No. 5,045,325, issued to Lesko et al., and U.S. Pat. No. 4,555,407, issued to Kramer et al., disclose processes for the continuous production of chewing gum products. In each case, however, the gum base is initially prepared separately and is simply added into the process. U.S. Pat. No. 4,968,511, issued to D'Amelia et al., discloses a chewing gum product containing certain vinyl polymers which can be produced in a direct one-step process not requiring the separate manufacture of gum base. However, the disclosure focuses on batch mixing processes not having the efficiency and product consistency achieved with continuous mixing. Also, the single-step processes are limited to chewing gums containing unconventional bases which lack elastomers and other critical ingredients. Furthermore, no provision is made in these processes for using rework or recycle gum.

In order to simplify and minimize the cost of chewing gum manufacture, there is a need or desire in the chewing gum industry for a continuous system for making chewing gum that can use the rework gum that is conventionally added to the Sigma blade batch mixer. Even more beneficial would be an integrated continuous manufacturing process having the ability to combine chewing gum base ingredients, other chewing gum ingredients and rework gum in a single mixer, which can be used to manufacture a wide variety of chewing gums.

CONTINUOUS CHEWING GUM MANUFACTURING PROCESS USING REWORK GUM

FIELD OF THE INVENTION

The present invention relates to a process for the continuous manufacture of chewing gum using rework gum.

BACKGROUND OF THE INVENTION

In a conventional chewing gum manufacturing process, a double arm Sigma blade mixer is used to mix chewing gum ingredients. Gum base, bulking agents such as sugar or sorbitol for sugarless gum, liquids such as syrup or liquid sorbitol, softeners such as glycerin and lecithin, and flavors are mixed about 5–20 minutes to manufacture the gum.

The warm, dough-like gum mass is removed from the mixer and added to a kneader from which it is forced or sheeted into a ribbon or rope to be formed into chunks, pellets, tabs, or sticks. After cooling, pellet gum is coated, but the other forms are wrapped in high speed wrapping machines. During this process some gum is not suitable for wrapping or some wrapped gum is not suitable for sale. Gum product may become damaged during kneading, cooling, transferring or wrapping, or wrapped product may not be properly packaged. All of this gum is called rework or recycle gum.

Generally, rework gum from the mixer, rework gum from the kneader, or rework gum formed during sheeting can be returned to the kneader and reworked because it is still fresh and warm. However, gum that has cooled or aged several days for wrapping is not suitable for the kneader, but needs to be added to the Sigma blade gum mixer. Gum which has passed its expiration date may also be unwrapped and mixed with fresh gum ingredients in the Sigma blade mixer. Generally about 5 to about 50% of the formula manufactured in the Sigma blade mixer may be from rework gum. Preferably rework gum may be about 10 to 25%, and most preferably about 15 to 20% of the total batch formula may be rework gum, with the remainder being fresh ingredients.

In gum manufacturing, aged rework gum added to a gum mixer not only allows for elimination of waste, but also improves the texture of the gum for handling and helps stabilize the texture during storage. The aged rework gum, whether it be one day aged or longer, has the effect of improving the texture by making it slightly tougher for handling in sheeting, cooling and wrapping.

Conventionally, chewing gum base and chewing gum products have been manufactured using separate mixers, different mixing technologies and, often, at different factories. One reason for this is that the optimum conditions for manufacturing gum base, and for manufacturing chewing gum from gum base and other ingredients such as sweeteners and flavors, are so different that it has been impractical to integrate both tasks. Chewing gum base manufacture, on the one hand, involves the dispersive (often high shear) mixing of difficult-to-blend ingredients such as elastomer, filler, elastomer plasticizer, base softeners/emulsifiers and, sometimes wax, and typically requires long mixing times. Chewing gum product manufacture, on the other hand, involves combining the gum base with more delicate ingredients such as product softeners, bulk sweeteners, high intensity sweeteners and flavoring agents using distributive (generally lower shear) mixing, for shorter periods.

In order to improve the efficiency of gum base and gum product manufacture, there has been a trend toward the

SUMMARY OF THE INVENTION

The present invention is a method for the continuous manufacture of a wide variety of chewing gum products using a continuous mixer and incorporating rework gum. Preferably the mixer is a single, high-efficiency mixer which does not require the separate manufacture of chewing gum base.

In a first aspect, the invention is a method of continuously manufacturing a chewing gum composition comprising the steps of:

a) continuously adding fresh chewing gum ingredients into a continuous mixer;

b) subjecting the fresh chewing gum ingredients to a continuous mixing operating within the mixer, thereby forming a chewing gum composition;

c) continuously discharging the chewing gum composition from the continuous mixer while fresh chewing gum ingredients continue to be introduced and mixed within the mixer; and d) adding a portion of a previously produced chewing gum composition to the mixer and mixing the portion of previously produced chewing gum with the fresh chewing gum ingredients being continuously added to the mixer and mixed to form the chewing gum composition.

In a second aspect, the invention is a method of continuously manufacturing a chewing gum composition without requiring the separate manufacture of a chewing gum base, comprising the steps of:

a) adding at least an elastomer and filler into a high-efficiency continuous mixer, and mixing the elastomer and filler together in the continuous mixer;

b) adding a least one ingredient selected from the group consisting of fats, oils, waxes and elastomer plasticizers into the continuous mixer, and mixing the ingredient with the elastomer and filler in the continuous mixer;

c) adding at least one sweetener, at least one flavor and a portion of a previously produced chewing gum composition into the continuous mixer, and mixing the sweetener, flavor and previously produced chewing gum composition with the remaining ingredients to form a chewing gum product; and d) wherein steps a)–c) are performed using a single, high-efficiency continuous mixer.

A high-efficiency continuous mixer is one which is capable of providing thorough mixing over a relatively short distance or length of the mixer. This distance is expressed as a ratio of the length of a particular active region of the mixer screw, which is composed of mixing elements, divided by the maximum diameter of the mixer barrel in this active region. The preferred method of the invention comprises performing the following mixing steps in a single continuous mixer:

a) adding and thoroughly mixing at least a portion of the chewing gum base ingredients (elastomer, elastomer plasticizer, filler, etc.) in a continuous mixer, using an L/D of not more than about 25;

b) adding at least a portion of the remaining (non-base) chewing gum ingredients (sweeteners, flavors, softeners, rework gum, etc.), and thoroughly mixing these ingredients with the gum base in the same mixer, using an L/D of not more than about 15; and c) sufficiently completing the entire addition and mixing operation in the same mixer, so that the ingredients exist as a substantially homogeneous chewing gum mass, using a total L/D of not more than about 40.

It is preferred that the gum base ingredients be completely added and mixed upstream from the remaining chewing gum ingredients, and that the remaining ingredients and rework gum be completely added downstream for mixing with the already blended gum base. Most preferably, the rework gum is added at the same time the bulk sweetener is added. However, the invention also includes those variations wherein a portion of the gum base ingredients may be added downstream with or after some of the remaining ingredients, and/or wherein a portion of the remaining (non-base) ingredients are added upstream with or before some of the base ingredients.

The invention has the advantage that chewing gum can be efficiently made on a continuous basis because the rework or recycle gum, whether it is unusable gum from the subsequent packaging operations or overaged gum, can be utilized and need not be wasted. In the preferred process, the entire gum base and gum manufacturing, using the rework gum, is all performed in one mixer. This reduces the capital equipment investment, and also labor costs, compared to conventional gum making processes. In the preferred process, there is greater product consistency, less thermal history and hence less thermal degradation, and less contamination than with chewing gum made by conventional processes.

Unexpectedly, it has also been discovered that the addition of rework gum reduces the temperature of the gum made in the continuous mixer. This further enhances the benefit of less thermal degradation.

The foregoing and other advantages of the invention will become further apparent from the following detailed description of the presently preferred embodiments, read in conjunction with the accompanying examples and drawings.

DETAILED DESCRIPTION OF THE DRAWINGS AND PRESENTLY PREFERRED EMBODIMENTS

As used herein, the term "chewing gum" also includes bubble gum and the like. All percentages are weight percentages unless otherwise specified.

Because the preferred embodiment of the invention uses a high-efficiency mixer known as a blade-and-pin mixer, and utilizes the manufacture of the gum base as well as the chewing gum composition in one mixer, the total manufacture of chewing gum, using a single continuous high-efficiency mixer, without requiring the separate manufacture of chewing gum base, will first be discussed. The total manufacture of chewing gum using a continuous mixer is further disclosed in U.S. Pat. No. 5,543,160, filed on Dec. 22, 1994, which is a continuation-in-part of U.S. application Ser. No. 08/305,363, filed on Sep. 13, 1994, now abandoned. Both of the foregoing patent and application are incorporated herein by reference.

The method of the present invention can be advantageously performed using a continuous mixer whose mixing screw is composed primarily of precisely arranged mixing elements with only a minor fraction of simple conveying elements. A preferred mixer is a blade-and-pin mixer exemplified in FIG. 1. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Figure 1:
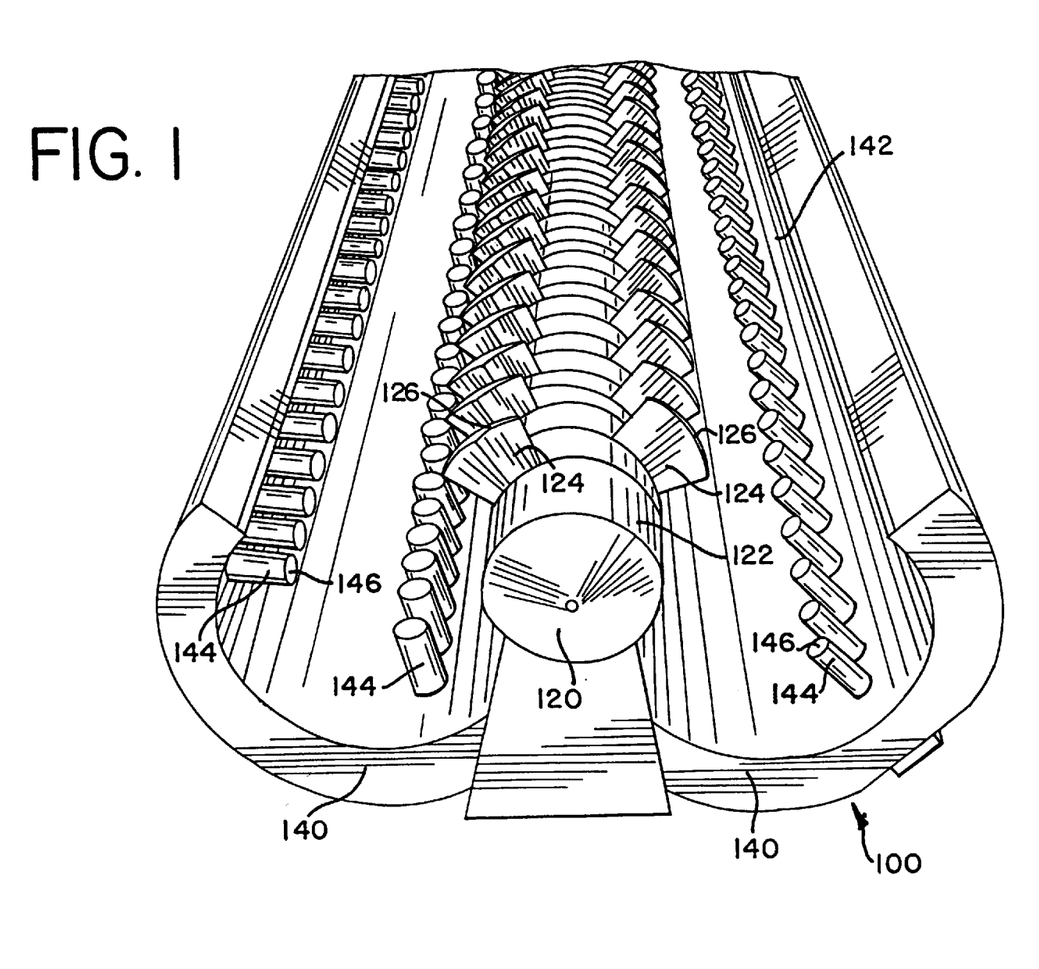
FIG. 1 is a partial exploded perspective view of a preferred Buss high-efficiency mixer used to practice the preferred method of the invention, illustrating a mixing barrel and mixing screw arrangement.

Referring to FIG. 1, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the screw shaft 122, and protrude radially inward from the barrel housing 142. The pins 144 are generally cylindrical in shape, and may have rounded or bevelled ends 146.

Figure 9:
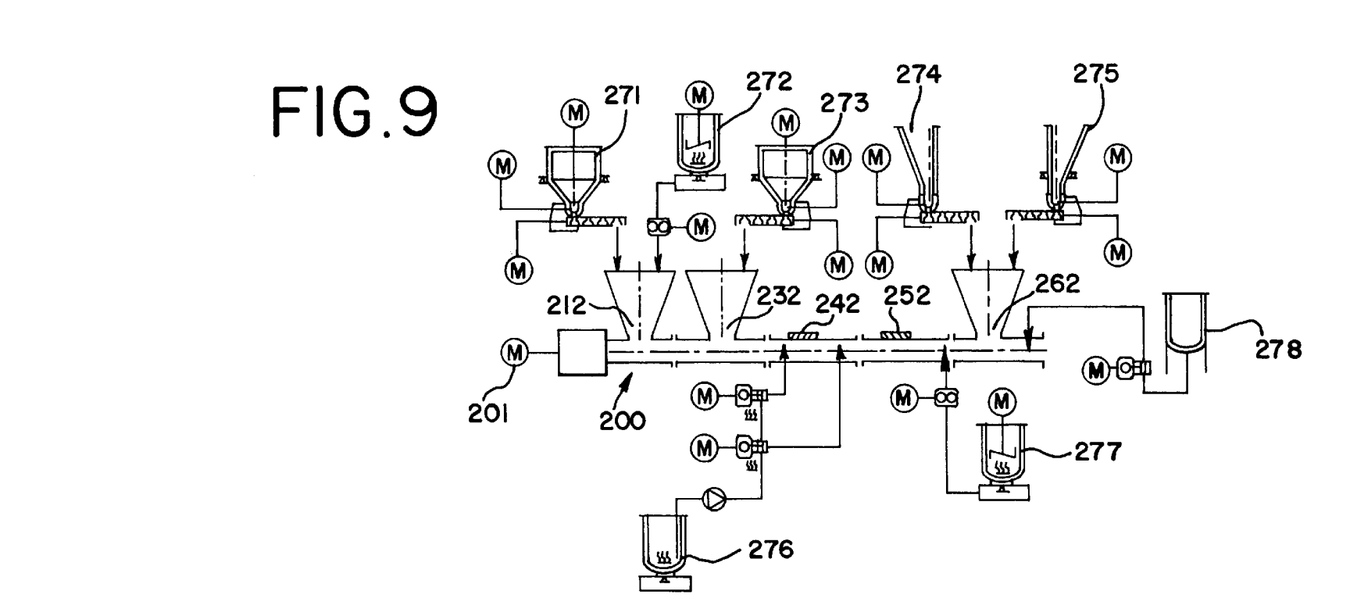
FIG. 9 is a schematic diagram of the relative arrangement of the equipment used to practice a preferred embodiment of the invention.

The mixing screw 120 with blades 124 rotates inside the barrel 140 and is driven by a variable speed motor 201 (FIG. 9). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
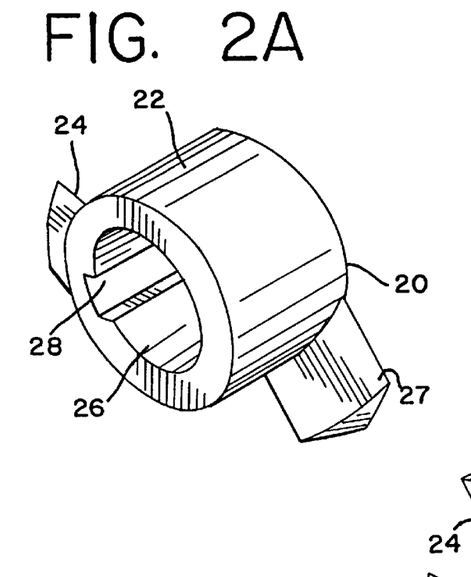
FIG. 2A is a perspective view of an on-screw element used on the upstream side of a restriction ring assembly, in a preferred high-efficiency mixer configuration.
Figure 2B:
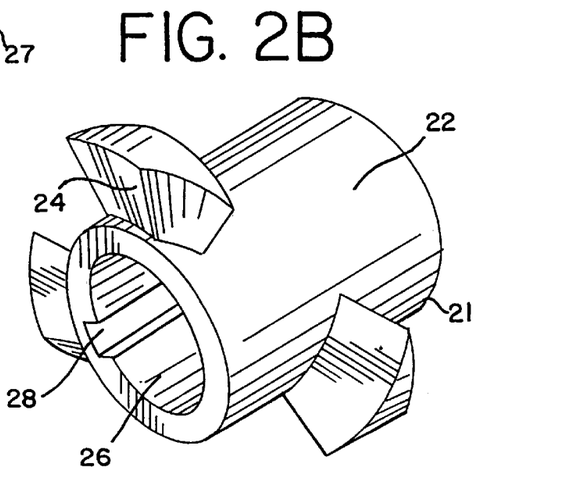
FIG. 2B is a perspective view of an on-screw element used on the downstream side of the restriction ring assembly in a preferred high-efficiency mixer configuration.
Figure 2C:
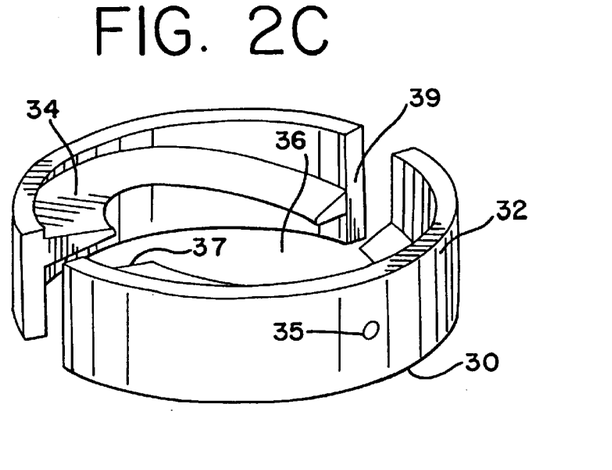
FIG. 2C is a perspective view of a restriction ring assembly used in a preferred high-efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 54 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
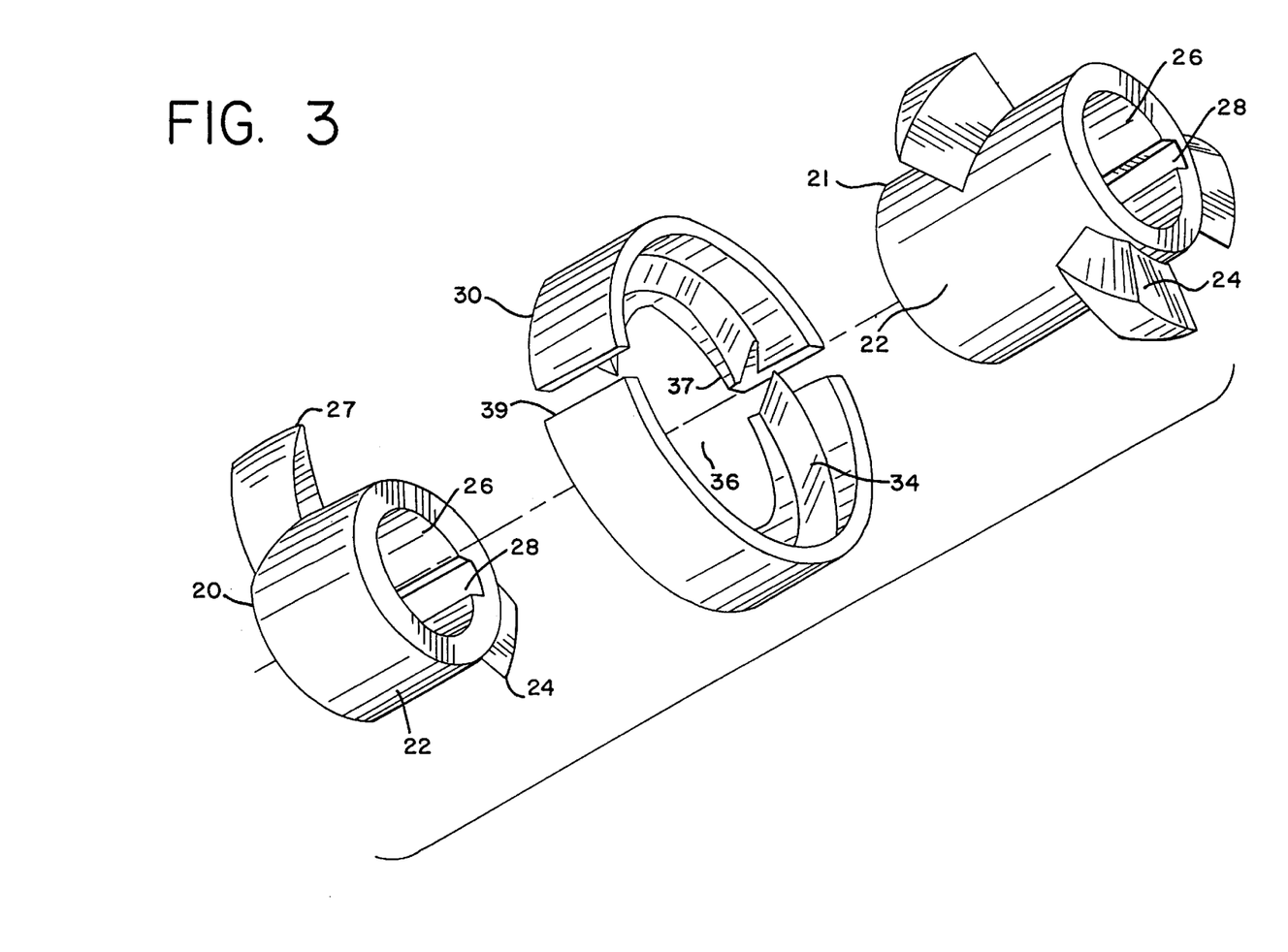
FIG. 3 is a perspective view showing the relative positioning of the elements of FIGS. 2A, 2B and 2C in a preferred high-efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction ring assembly 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction ring assembly 30 during operation of the mixer 100. It should be noted that the upstream on-screw element 20 has an L/D of about ⅓, and the downstream on-screw element 21 has an L/D of about ⅔, resulting in a total L/D of about 1.0 for the on-screw elements. The restriction ring assembly 30 has a smaller L/D of about 0.45 which coincides with the L/D of the on-screw elements 20 and 21, which engage each other but do not touch the restriction ring assembly.

Figure 4:
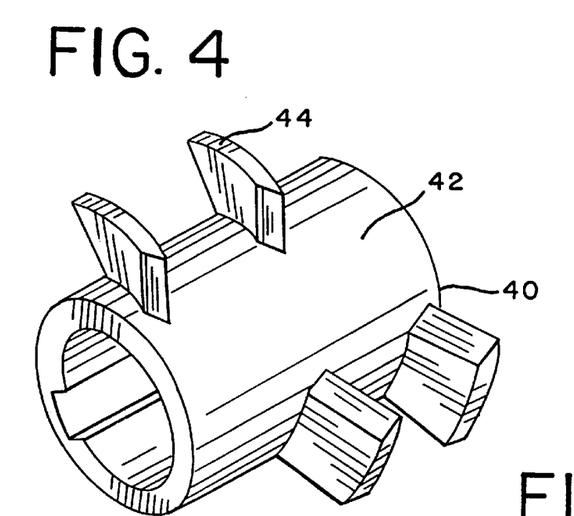
FIG. 4 is a perspective view of a low-shear mixing screw element used in a preferred high-efficiency mixer configuration.
Figure 5:
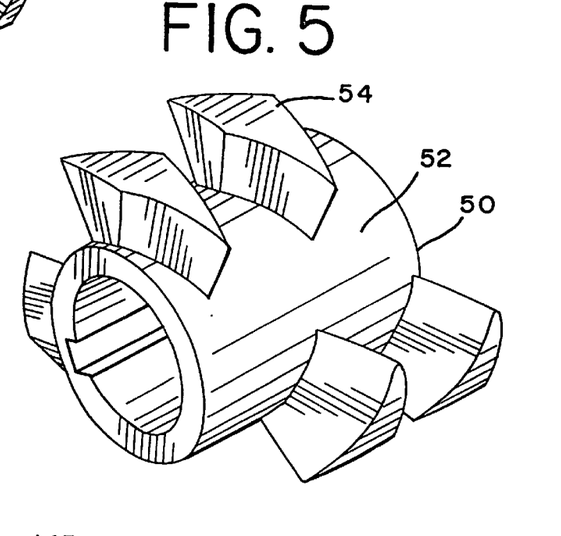
FIG. 5 is a perspective view of a high-shear mixing screw element used in a preferred high-efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
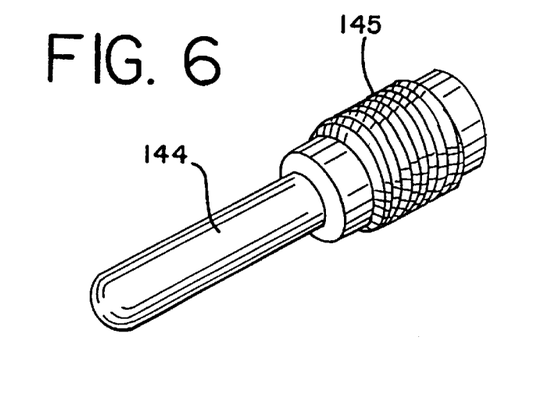
FIG. 6 is a perspective view of a barrel pin element used in a preferred high-efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
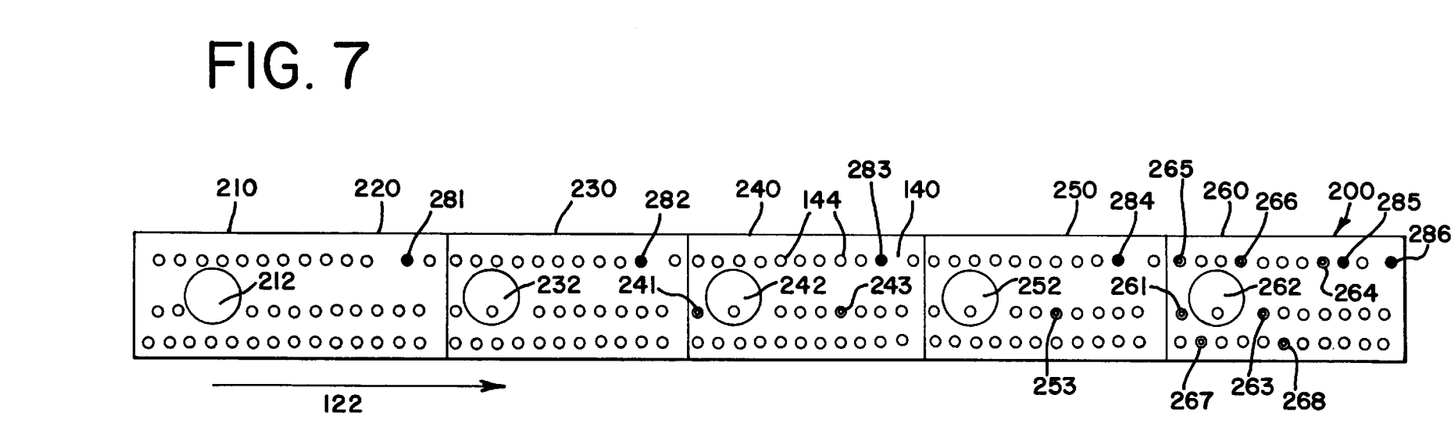
FIG. 7 is a schematic diagram of a preferred arrangement of mixing barrel pins and ingredient feed ports used to practice an embodiment of the invention.
Figure 8:
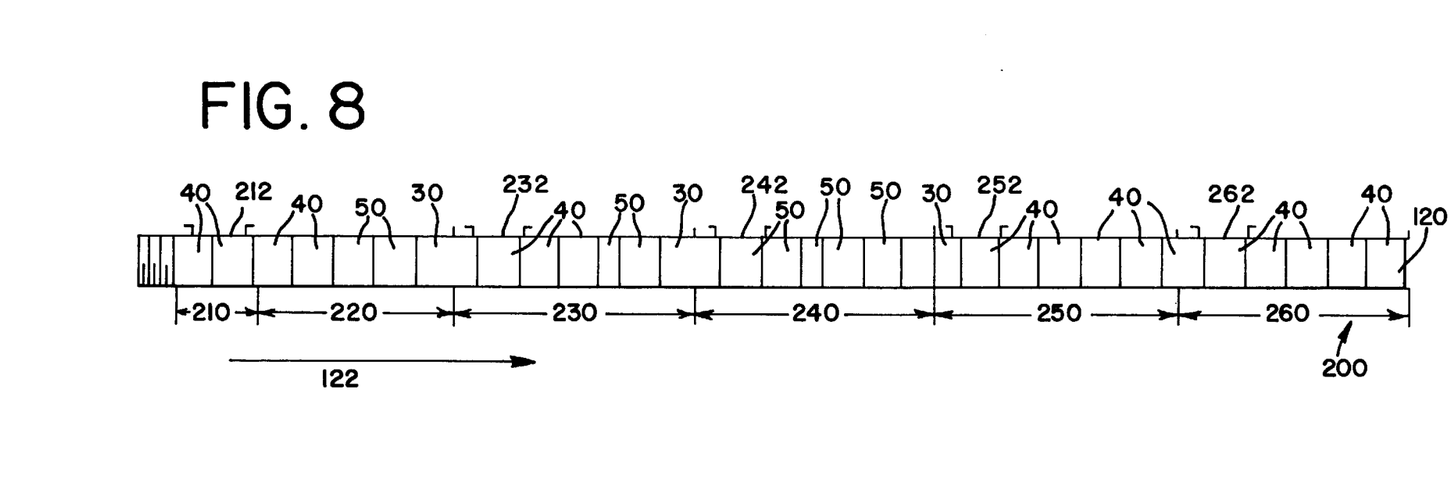
FIG. 8 is a schematic diagram of a preferred mixing screw configuration used in conjunction with FIG. 7.

FIG. 7 is a schematic view showing a preferred barrel configuration, including a preferred arrangement of barrel pins 144. FIG. 8 is a corresponding schematic view illustrating a preferred mixing screw configuration. The mixer 200 whose preferred configuration is illustrated in FIGS. 7 and 8 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with smaller liquid injection ports 241, 243, 253, 261, 263, 264, 265, 266, 267 and 268 which are used to add liquid ingredients. The liquid injection ports 241, 243, 253, 261, 263, 264, 265, 266, 267, and 268 include special barrel pins 144 formed with hollow centers, as explained above. As such, the positions of the smaller liquid injection ports can readily be changed. Also, not all of the injection ports need be used during a particular gum manufacturing operation. In that case, normal barrel pins will be used at the locations marked in FIG. 7 as a liquid injection port. Temperature sensors may also be used on some barrel pins 144 to measure product temperatures within the mixer.

Referring to FIG. 7, barrel pins 144 are preferably present in most or all of the available locations, in all three rows as shown.

Referring to FIG. 8, one preferred configuration of the mixing screw 120 for some chewing gum products is schematically illustrated as follows. Zone 210, which is the initial feed zone, is configured with about 1⅓ L/D of low shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅓ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230, have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 30 with cooperating on-screw elements 20 and 21 having an L/D of about 1.0. Then, zone 240 is configured, from left to right, with 4.5 high shear mixing elements 50 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 30 with cooperating on-screw elements having an L/D of about 1.0. Then, the remainder of the fourth mixing zone 250 and the fifth mixing zone 260 are configured with eleven low shear mixing elements 40 contributing a mixing L/D of about 7⅓. Zone 250 has a total mixing L/D of about 4.0, and zone 260 has a total mixing L/D of about 4.0.

Before explaining where the various chewing gum ingredients are added to the continuous mixer 200, and how they are mixed, it is helpful to discuss the composition of typical chewing gums that can be made using the method of the invention. A chewing gum generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, elastomer plasticizers (resins), fats, oils, waxes, softeners and inorganic fillers. The elastomers may include polyisobutylene, isobutylene-isoprene copolymer, styrene butadiene copolymer and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax.

The gum base typically also includes a filler component such as calcium carbonate, magnesium carbonate, talc, dicalcium phosphate and the like; softeners, including glycerol monostearate and glycerol triacetate; and optional ingredients such as antioxidants, color and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

For continuous processing, rework gum needs to be added to become part of the finished gum product. In this case, the gum product that is not suitable for sheeting, cooling or wrapping because of downstream processing problems needs to be reworked and added into the continuous gum manufacturing extruder. The amount of rework gum may be about 5 to 50% of the total formula, preferably about 10 to 30% and most preferably about 10–20% of the total formula. The rework gum will preferably be added at a constant rate. However, because its composition will preferably be just the same as the composition of the final gum product, it is not necessary that the rework be added in at a constant rate.

The reworked gum may be added with the powdered sugar or powdered bulking agent after the base has been premixed or presoftened. Rework gum may be heated to presoften it or preferably may be added at room temperature. If the base is too hot from processing or remelting, rework gum may be added before the powdered bulking agent to cool the mass.

In the preferred embodiments of the invention, the gum base and ultimate chewing gum product are made continuously in the same mixer. Generally, the gum base portion is made using a mixing L/D of about 25 or less, preferably about 20 or less, most preferably about 15 or less. Then, the remaining chewing gum ingredients, including the rework, are combined with the gum base to make a chewing gum product using a mixing L/D of about 15 or less, preferably about 10 or less, most preferably about 5 or less. The mixing of the gum base ingredients and the remaining chewing gum ingredients may occur in different parts of the same mixer or may overlap.

When the preferred blade-and-pin mixer is used, having the configuration described above, the total chewing gum can be made using a mixing L/D of about 19. The gum base can be made using an L/D of about 15 or less, and the remaining gum ingredients can be combined with the gum base using a further L/D of about 5 or less.

For the BUSS Extruder, as described above, rework gum may be added at feed port 252 or feed port 262. Port 262 is where powdered bulking agents are added. It is preferable to add rework gum at port 262 since higher amounts of rework gum can be added at a lower RPM. Also, adding rework at port 262 seems to create more cooling capability than when added at port 252.

In order to accomplish the total chewing gum manufacture using the preferred blade-and-pin mixer 200 (FIG. 1), it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260 (FIG. 7).

In order to manufacture the gum base, the following procedure can be followed. The elastomer, filler, and at least some of the elastomer solvent are added to the first large feed port 212 in the feed zone 210 of the mixer 200, and are subjected to highly dispersive mixing in the first mixing zone 220 while being conveyed in the direction of the arrow 122. The remaining elastomer solvent (if any) and polyvinyl acetate are added to the second large feed port 232 in the second mixing zone 230, and the ingredients are subjected to a more distributive mixing in the remainder of the mixing zone 230.

Fats, oils, waxes (if used), emulsifiers and, optionally, colors and antioxidants, are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color.

The fourth mixing zone 250 is used primarily to cool the gum base, although minor ingredient addition may be accomplished. Then, to manufacture the final chewing gum product, glycerin, corn syrup, other bulk sugar sweeteners, rework gum, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Glycerin may be added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories.

Testing The Suitability Of A Continuous Mixer

The following preliminary test can be employed to determine whether a particular continuous mixer with a particular configuration meets the requirements of a high-efficiency mixer suitable for practicing the preferred method of the invention.

A dry blend of 35.7% butyl rubber (98.5% isobutylene-1.5% isoprene copolymer, with a molecular weight of 120,000–150,000, manufactured by Polysar, Ltd. of Sarnia, Ontario, Canada as POLYSAR Butyl 101-3); 35.7% calcium carbonate (VICRON 15-15 from Pfizer, Inc., New York, N.Y.); York); 14.3% polyterpene resin (ZONAREZ 90 from Arizona Chemical Company of Panama City, Fla.) and 14.3% of a second polyterpene resin (ZONAREZ 7125 from Arizona Chemical Company) is fed into the continuous mixer in question equipped with the mixer configuration to be tested. The temperature profile is optimized for the best mixing, subject to the restriction that the exit temperature of the mixture does not exceed 170° C. (and preferably remains below 160° C.) to prevent thermal degradation. In order to qualify as a suitable high-efficiency mixer, the mixer should produce a substantially homogeneous, lump-free compound with a uniform milky color in not more than about 10 L/D, preferably not more than about 7 L/D, most preferably not more than about 5 L/D.

To thoroughly check for lumps, the finished rubber compound may be stretched and observed visually, or compressed in a hydraulic press and observed, or melted on a hot plate, or made into a finished gum base which is then tested for lumps using conventional methods.

Also, the mixer must preferably have sufficient length to complete the manufacture of the gum base, and of the chewing gum product, in a single mixer, using a total mixing L/D of not more than about 40. Any mixer which meets these requirements falls within the definition of a high-efficiency mixer suitable for practicing the preferred method of the invention.

For the examples below, various heated tanks, feeders and a BUSS blade-and-pin mixer with a 100 mm mixer screw diameter were set up as shown in FIGS. 7 and 9 and used to make a cinnamon flavored chewing gum composition. The mixer 200 was set up with five mixing zones having a total mixing L/D of 19, and an initial conveying zone having an L/D of 1⅓. No die was used at the end of the mixer, unless indicated otherwise, and the product mixture exited as a continuous rope.

Liquid ingredients were fed using volumetric pumps from tanks 272, 276, 277 and 278 into the large feed ports 212 and smaller liquid injection ports. The pumps were appropriately sized and adjusted to achieve the desired feed rates.

Dry ingredients were added using gravimetric screw feeders 271, 273, 274 and 275 into the large addition ports 212, 232 and 262. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 200° F., and oil cooling ws used at higher temperatures. Where water cooling was desired, tap water (typically at about 57° F.) was used without additional chilling.

Temperatures were recorded for both the fluid and the ingredient mixture. Fluid temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120.

Actual mixture temperatures were recorded by temperature sensors 281, 282, 283, 284, 285 and 286 (FIG. 7). These sensors were located near the downstream end of mixing zones 220, 230, 240 and 250 and at two places in mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

Figure 10:
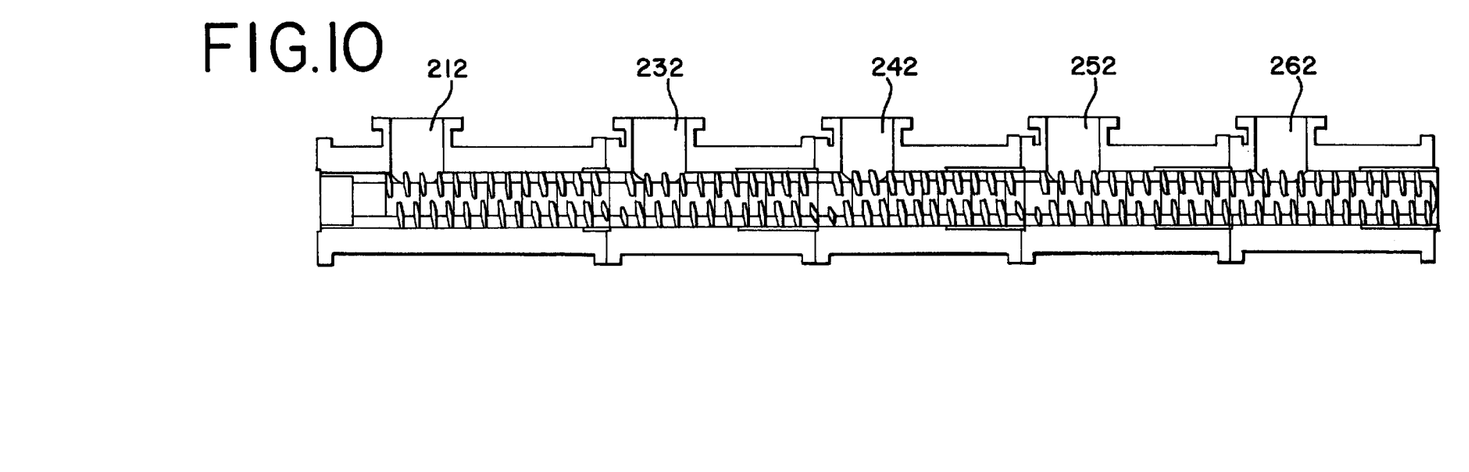
FIG. 10 is a schematic diagram of the preferred mixing screw configuration used in the arrangement of FIG. 9.

The screw was configured as follows (FIG. 10):

In the first barrel section, four low shear then two high shear elements having a total L/D of 4 were fitted to the screw shaft. Straddling the end of the first section and the beginning of the second was a 57 mm restriction ring which, along with its on-screw hardware, had a L/D of 1.

In the second section, three low shear elements then 1½ high shear elements having a total L/D of 3 were fitted. Straddling the end of the second section and beginning of the third was a 60 mm restriction ring (1 L/D).

In the third section was fitted 4½ high shear elements (3 L/D). A 60 mm restriction ring (1 L/D) straddled the third and fourth sections.

The fourth section was fitted with six low shear elements (4 L/D), the last of which extended in to the fifth section.

The fifth section was fitted with five low shear elements, one adjacent to the ingredient addition port, having a total L/D of 3⅓. The total screw length was 20⅓ L/D.

Comparative Example A-(No recycle) Several premix compositions were prepared to simplify the mixing process.

Rubber Blend Three parts butyl rubber were ground with one part calcium carbonate. 32.785% of the ground mixture was dry blended with 51.322% calcium carbonate and 15.893% glycerol ester of hydrogenated rosin.

Polyvinyl Acetate Blend 48.421% low molecular weight PVAc was dry blended with 11.849% glycerol ester of polymerized rosin and 39.730 glycerol ester of hydrogenated rosin.

Fat Blend The following ingredients were melted and blended:

| | |
|---|---|
| 7.992% | Hydrogenated Soybean Oil |
| 13.712% | Hydrogenated Cottonseed Oil |
| 12.199% | Glycerol Monostearate |
| 37.070% | Paraffin Wax |
| 28.852% | Microcrystalline Wax |
| 0.175% | BHT |

Corn Syrup/Glycerin Blend 93.710% 45.5° Baume corn syrup was heated and blended with 6.290% glycerin.

Sugar/Color Blend 10% of a glycerin slurry of red lake was mixed with 90% sugar in a Hobart mixer. The resulting product was a damp powder which could be fed into the extruder with a twin screw volumetric feeder.

The feed ports for the mixer are depicted in FIGS. 7 and 9. To the first port 212 were added the rubber blend (21.90 lbs/hr) from feeder 271 and molten polyisobutylene (3.70 lbs/hr) from tank 272.

Into the second port 232 was added the polyvinyl acetate blend at 15.8 lbs/hr. from feeder 273.

The molten fat blend was injected in equal portions through two injection pins 241 and 243 in section 240 at a total rate of 17.0 lbs/hr.

The heated corn syrup/glycerin blend was injected from tank 277 through pin 261 located at the beginning of Section 260 at a rate of 49.80 lbs/hr.

Sugar was added into port 262 at a rate of 178.8 lbs/hr along with the sugar/color blend at 8.80 lbs/hr.

Finally, cinnamon flavor was injected from tank 278 through pin 264 near the end of section 260 at a rate of 4.20 lbs/hr.

This produced a total output of approximately 300 lbs/hr from the extruder.

The zone temperatures ($Z_1$–$Z_5$ in °F.) were set to 350, 350, 150, 55 and 55. The screw was heated to 150° F.

With those feed rates, the cinnamon gum had the following formula:

|  | % |
| --- | --- |
| Base | 19.46 |
| Sugar | 62.24 |
| 45.5° Baume Corn Syrup | 15.57 |
| Glycerin | 1.05 |
| Color | 0.29 |
| Flavor | 1.31 |
|  | 100.00 |

In comparative Example A and Examples 1–3, it was necessary to operate the screw at 70 rpm in order to prevent a backup of sugar in the fifth intake port. The finished gum exited at 122° F. Both the screw speed and the exit temperature were considered excessive.

A product with the same formula as used in Comparative Example A was made in a conventional batch process and formed into pellets to be used as rework or recycle gum in the examples below. Comparative Examples B–E used the same formula as Comparative Example A. Examples 1–8 also used the same formula as Comparative Example A but with different levels of recycle gum added. Recycle gum was added using a vibratory feeder for the pelletized recycle gum and added at feed port 252 or feed port 262.

Example 1

10% recycle gum was added at port 262 at 33 lbs/hr, giving an output of 333 lbs/hr and a product temperature of 120° F.

Example 2

20% recycle gum was added at port 262 at 75 lbs/hr, giving an output of 375 lbs/hr and a product temperature of 118° F.

Example 3

30% recycle gum was added at port 262 at 128 lbs/hr, giving an output of 428 lbs/hr and a product temperature of 116° F. Note the reduction in product temperature from 121 to 116° F.

Example 4

39% recycle gum was added at port 262 at 190 lbs/hr, giving an output of 490 lbs/hr. The mixer speed was increased to 85 RPM to accomplish the higher throughput, and the product temperature increased to 118° F.

Comparative Example B

No recycle gum was added, but the product temperature at discharge was 129° F. for a mixer speed of 85 RPM, compared to a temperature of 118° F. with 39% added recycle in Example 4.

Example 5

49% recycle gum was added at port 262 at 285 lbs/hr, and the RPM was increased to 100. The output was 585 lbs/hrs and the product temperature was 125° F.

Comparative Example C

No recycle gum was added. With a 300 lbs/hr throughput at a mixer speed of 100 RPM, the product discharge temperature was 132° F., compared to 125° F. with 49% recycle gum in Example 5.

Example 6

10% recycle gum was added at port 252 at 33 lbs/hr, giving an output of 333 lbs/hr. The mixer speed was at 70 RPM and the discharge product temperature was 125° F. The increased discharge temperature may have been due to a longer mixing time in the mixer.

Example 7

30% recycle gum was added at port 252 at 128 lbs/hr to give an output of 428 lbs/hr using a mixer spped of 80 RPM. The product discharge temperature was 128° F.

Comparative Example D

No recycle gum was added. The mixer speed was 80 RPM. The product discharge temperature was 128° F.

Example 8

40% recycle gum was added at port 252 at 200 lbs/hr, giving an output of 500 lbs/hr. The speed was increased to 90 RPM and the product discharge temperature was 130° F.

Comparative Example E

No recycle gum was added and the output was 300 lbs/hr at a mixer speed of 90 RPM. The discharge product temperature was 132° F.

Comparative Example F

This example plus the following inventive Examples 9–13 used the same extruder screw configuration as the other examples except that in the third section, 2½ low shear elements and 2 high shear elements were used in place of 4½ high shear elements. Also, a peppermint flavored sugar chewing gum was made having the following formula:

|  | % |
| --- | --- |
| Base | 20.0 |
| Sugar | 57.3 |
| Dextrose Monohydrate | 10.4 |
| 43° Baume Corn Syrup | 10.0 |
| Peppermint Flavor | 0.9 |
| Lecithin | 0.1 |
| Glycerin | 1.3 |
|  | 100.0 |

A blend of 24.4% dusted ground butyl rubber (75% rubber, 25% calcium carbonate), 18.0% low molecular weight terpene resin, 18.3% high molecular weight terpene resin and 39.4% fine ground calcium carbonate was added to the first large port 212 (FIG. 7) at 27.6 lb/hr.

A blend of 11.1% high molecular weight polyvinyl acetate and 88.9% low molecular weight polyvinyl acetate was added into the second large feed port 232 at 14.4 lb/hr. Polyisobutylene (preheated to 100° C.) was also added to this port at 3.5 lb/hr.

A fat mixture (83° C.) was added in equal amounts into ports 241 and 243, at a total rate of 14.5 lb/hr. This fat mixture included 31.9% hydrogenated cottonseed oil, 18.7% hydrogenated soybean oil, 13.2% partially hydrogenated cottonseed oil, 19.8% glycerol monostearate, 13.7% soy lecithin, 2.5% cocoa powder and 0.2% BHT.

Glycerin was injected into port 261 at 3.9 lb/hr. A mixture of 84.6% sucrose and 15.4% dextrose monohydrate was added to port 262 at 203.1 lb/hr. Corn syrup (40° C.) was injected into port 263 at 30.0 lb/hr. A mixture of 90% peppermint flavor and 10% soy lecithin was injected into port 264 at 3.0 lb/hr.

The zone temperatures (Z1–Z5, °F.) were set at 350, 350, 100, 50 and 50, respectively, and the screw temperature was set at 100° F. The mixture temperatures (T1–T6, °F.) were measured as 302, 262, 156, 106, 100 and 109, respectively. The screw rotation was set at 55 rpm.

The product exited the mixer at 120° F. The finished product had good chew characteristics and there was no evidence of rubber lumps.

A product of the same formula as Comparative Example F was made in a conventional batch process and sheeted into sticks. The sticks were then used as rework gum in Examples 9–13 below.

Example 9

33% full sticks of rework gum were added at port 252 at 100 lbs/hr after reducing the fresh ingredient input to 200 lbs/hr. The product temperature was 49–52° C.

Example 10

33% full sticks of rework were gum added at 100 lbs/hr with 200 lbs/hr of fresh ingredients to give a total output of 300 lbs/hr. The product temperature was 49–51° C.

Example 11

- After reducing the fresh ingredient input to 150 lbs/hr, 150 lbs of full sticks of rework gum were added at port 252. The product temperature was 49–51° C.

Example 12

67% full sticks of rework gum were added at 300 lbs/hr at port 262 with 150 lbs/hr of fresh ingredients. The product temperature was 49–50° C.

Example 13

67% full sticks of rework gum were added at 300 lbs/hr at port 252 with 150 lbs/hr fresh ingredients. product temperature was 51–54° C.

The foregoing examples show how rework or recycle gum can be used in a contenuous gum manufacturing process. It is believed that the use of rework gum will provide the same benefits to continuous gum manufacturing processes and products as it does to batch processes and products.

It was also found that the addition of rework gum had a surprising effect of lowering the temperature of the gum produced in a continuous basis. Also, as shown by comparing Examples 4 and 8, the point of addition of the rework gum has a suprising effect. In both Examples, about 40% rework gum was added, and the mixer speeds were about the same. However, when the rework gum was added to port 252, the gum had an exit temperature of 130° F., whereas when it was added at port 262, the temperature was much lower, about 118° F. This lower exit temperature is better because at higher exit temperatures more volatile flavor components are lost and the gum seems to dry out quicker.

It should be appreciated that the methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of continuously manufacturing a chewing gum composition without separate manufacture of a chewing gum base, comprising the steps of:
   a) adding at least an elastomer and filler into a single high-efficiency continuous mixer, and mixing the elastomer and filler together in the continuous mixer;
   b) adding at least one ingredient selected from the group consisting of fats, oils, waxes and elastomer plasticizers into the continuous mixer, and mixing said at least one ingredient with the elastomer and filler in the continuous mixer to form a complete gum base; and
   c) adding at least one sweetener, at least one flavor and a portion of a previously produced chewing gum composition into the continuous mixer, and mixing said sweetener, flavor and previously produced chewing gum composition with the remaining ingredients to form the chewing gum composition in the continuous mixer.

2. The method of claim 1 wherein steps a)–c) are performed using a mixing L/D of not more than about 40.

3. The method of claim 2 wherein steps a) and b) are performed using a mixing L/D of not more than about 25.

4. The method of claim 1 wherein steps a)–c) are performed using a total mixing L/D of not more than about 30.

5. The method of claim 1 wherein the portion of previously produced gum composition comprises about 5% to about 50% of the chewing gum composition.

6. The method of claim 1 wherein the addition of previously produced chewing gum results in a reduction of the temperature at which the chewing gum composition is discharged from the continuous mixer.

7. The method of claim 1 wherein the mixer has a length L and a diameter D and the at least one sweetener and at least one flavor are combined with the portion of previously produced chewing gum composition to make the chewing gum composition using a mixing L/D of about 10 or less.

8. A method of continuously manufacturing a chewing gum composition without separate manufacture of a chewing gum base, comprising the steps of:
   a) adding at least three individual gum base ingredients including an elastomer, polyvinyl acetate and filler into a single, high-efficiency continuous mixer, using at least two separate feed ports in the mixer for said addition;
   b) subjecting at least the elastomer and filler to dispersive mixing in the continuous mixer;
   c) adding at least one sweetener and at least one flavoring agent into at least a third separate feed port in the continuous mixer;
   d) adding a portion of a previously produced chewing gum composition to the continuous mixer;

e) subjecting at least the sweetener, flavoring agent, elastomer, filler and previously produced chewing gum composition to distributive mixing in the continuous mixer to form the chewing gum composition; and f) continuously discharging the chewing gum composition from the continuous mixer.

9. The method of claim 8 wherein the elastomer comprises an ingredient selected from the group consisting of polyisobutylene, isobutylene-isoprene copolymer, styrene butadiene copolymer, latexes and mixtures thereof.

10. The method of claim 8 wherein the filler comprises an ingredient selected from the group consisting of calcium carbonate, magnesium carbonate, talc, dicalcium phosphate and mixtures thereof.

11. The method of claim 8 further comprising the steps of adding at least one ingredient selected from the group consisting of fats, oils, waxes and mixtures thereof to the elastomer and filler in the continuous mixer, and subjecting said at least one ingredient to distributive mixing with the elastomer and filler.

12. The method of claim 8 wherein the sweetener comprises a sugar sweetener selected from the group consisting of sucrose, dextrose, maltose, dextrin, dried invert sugar, fructose, levulose, galactose, corn syrup solids and mixtures thereof.

13. The method of claim 8 wherein the sweetener comprises a sugarless sweetener selected from the group consisting of sugar alcohols, high intensity sweeteners and combinations thereof.

14. The method of claim 8 wherein the flavoring agent comprises an ingredient selected from the group consisting of citrus oil, fruit essences, peppermint oil, spearmint oil, other mint oils, clove oil, oil of wintergreen, anise and mixtures thereof.

15. The method of claim 8 where the mixer has a length L and a diameter D and the at least one sweetener and at least one flavoring agent are combined with the portion of previously produced chewing gum composition to make the chewing gum composition using a mixing L/D of about 10 or less.

16. A method of continuously manufacturing a chewing gum composition without separate manufacture of a chewing gum base, comprising the steps of:

a) adding at least an elastomer and filler as gum base ingredients into a single, high-efficiency, blade-and-pin continuous mixer, using at least a first feed port in the mixer for said addition, and mixing the elastomer and filler together using blades and pins;

b) adding at least one further gum base ingredient selected from the group consisting of fats, oils, waxes, elastomer plasticizers and combinations thereof into the blade-and-pin mixer, using at least one further feed port separate from the first feed port, and mixing said at least one further gum base ingredient with the elastomer and filler using blades and pins; and c) adding at least one sweetener, at least one flavor and a portion of a previously produced chewing gum composition into the blade-and-pin mixer, using at least one additional feed port separate from the first feed port and further feed port, and mixing said sweetener, flavor and previously produced chewing gum composition with the gum base ingredients to form the chewing gum composition in the blade-and-pin mixer.

17. The method of claim 16 wherein the blade-and-pin mixer comprises first, second, third, fourth and fifth mixing zones.

18. The method of claim 17, wherein steps a) and b) are substantially performed before the fifth mixing zone.

19. The method of claim 17 wherein step c) is substantially performed after the third mixing zone.

20. The method of claim 17 wherein the previously produced chewing gum is added to and mixed within the fifth mixing zone.

21. The method of claim 16 wherein the blades of the continuous mixer are mounted to a mixing screw which rotates at less than about 150 rpm.

22. The method of claim 21 wherein the mixing screw rotates at less than about 100 rpm.

23. The method of claim 16 wherein the mixer includes one or more points of restriction before step c).

24. The method of claim 23 wherein the one or more points of restriction are created by one or more restriction rings.

25. The method of claim 16 wherein the mixer has a length L and a diameter D and the at least one sweetener and at least one flavor are combined with the portion of previously produced chewing gum composition to make the chewing gum composition using a mixing L/D of about 10 or less.

26. A method of continuously producing a chewing gum composition without separate manufacture of a chewing gum base, comprising the steps of:

a) adding at least three individual chewing gum base ingredients including an elastomer, elastomer plasticizer and filler into a single, high-efficiency continuous mixer, using at least two separate feed ports in the mixer for said addition, and mixing the elastomer, elastomer plasticizer and filler together in the continuous mixer;

b) adding at least one further gum base ingredient selected from the group consisting of fats, oils, waxes and combinations thereof into at least a third separate feed port in the continuous mixer, and mixing said further ingredient with the elastomer, elastomer plasticizer and filler in the continuous mixer;

c) adding at least one sweetener and at least one flavor into at least a fourth separate feed port the continuous mixer, and mixing said sweetener and flavor with the gum base ingredients in the continuous mixer; and d) adding a portion of a previously produced chewing gum composition to the continuous mixer and mixing the portion of previously produced chewing gum composition with the chewing gum ingredients being added to the continuous mixer to form the chewing gum composition.

27. The method of claim 26 wherein the filler is mixed with the elastomer prior to any substantial mastication of the elastomer.

28. The method of claim 26 wherein the portion of previously produced chewing gum added to the mixer is between about 10% and about 30% of the chewing gum composition being produced.

29. The method of claim 26 wherein the previously produced chewing gum is in the form of chewing gum which has cooled to room temperature.

30. The method of claim 26 wherein the previously produced chewing gum is in the form of sticks that have been wrapped and unwrapped.

31. The method of claim 26 wherein the mixer has a length L and a diameter D and the fresh chewing gum ingredients are combined with the portion of previously produced chewing gum composition to make the chewing gum composition using a mixing L/D of about 10 or less.

* * * * *